(12) United States Patent
Ilic et al.

(10) Patent No.: US 10,414,092 B2
(45) Date of Patent: Sep. 17, 2019

(54) INTERCHANGEABLE FABRICATION HEAD ASSEMBLY

(71) Applicant: Voltera Inc., Kitchener (CA)

(72) Inventors: Katarina Ilic, Waterloo (CA); Jesus Antonio Zozaya MacGregor, St. Catherines (CA); Alroy Arthur Almeida, Mississauga (CA); James Douglas Marcel Pickard, St. Catherines (CA); Matthew Ewertowski, Brampton (CA)

(73) Assignee: Voltera Inc., Kitchener (CA)

( * ) Notice: Subject to any disclaimer, the term of this patent is extended or adjusted under 35 U.S.C. 154(b) by 91 days.

(21) Appl. No.: 15/019,250

(22) Filed: Feb. 9, 2016

(65) Prior Publication Data

US 2016/0229121 A1    Aug. 11, 2016

Related U.S. Application Data

(60) Provisional application No. 62/113,664, filed on Feb. 9, 2015.

(51) Int. Cl.

| | | |
|---|---|---|
| *B29C 64/20* | (2017.01) | |
| *B29C 64/106* | (2017.01) | |
| *B33Y 30/00* | (2015.01) | |
| *B33Y 50/02* | (2015.01) | |
| *B29C 64/386* | (2017.01) | |
| *B29C 64/259* | (2017.01) | |

(52) U.S. Cl.
CPC ............ *B29C 64/20* (2017.08); *B29C 64/106* (2017.08); *B29C 64/259* (2017.08); *B29C 64/386* (2017.08); *B33Y 30/00* (2014.12); *B33Y 50/02* (2014.12)

(58) Field of Classification Search
CPC ... B29C 64/245; B29C 64/106; B29C 64/386; B29C 64/20; B29C 64/259
See application file for complete search history.

(56) References Cited

U.S. PATENT DOCUMENTS

| | | |
|---|---|---|
| 5,716,663 A | 2/1998 | Capote et al. |
| 8,327,534 B2 | 12/2012 | Park et al. |
| 2005/0174407 A1 | 8/2005 | Johnson et al. |
| 2006/0072944 A1 | 4/2006 | Sharma et al. |
| 2006/0159899 A1 | 7/2006 | Edwards et al. |
| 2006/0160432 A1 | 7/2006 | Silveston-Keith |
| 2006/0200980 A1 | 9/2006 | Gagne |

(Continued)

OTHER PUBLICATIONS

Kamyshny et al., "Metal-based Inkjet Inks for Printed Electronics", The Open Applied Physics Journal, 2011, pp. 19-36, vol. 4.

(Continued)

*Primary Examiner* — Robert J Grun
*Assistant Examiner* — Michael Robinson
(74) *Attorney, Agent, or Firm* — Own Innovation

(57) ABSTRACT

The present disclosure provides an interchangeable head for a fabrication system. The interchangeable head includes a fabrication module, a sheath for receiving and encasing the fabrication module a control system for controlling the fabrication module during fabrication of an object, and a coupling mechanism for securely attaching and detaching the interchangeable head to a carriage mounted to the fabrication system.

16 Claims, 11 Drawing Sheets

(56) References Cited

U.S. PATENT DOCUMENTS

| | | | | |
|---|---|---|---|---|
| 2006/0288932 A1* | 12/2006 | Mori | ................. | H05K 3/125 |
| | | | | 118/313 |
| 2010/0031882 A1* | 2/2010 | Abe | ................. | B05C 19/04 |
| | | | | 118/620 |
| 2015/0037445 A1* | 2/2015 | Murphy | ............ | B29C 67/0088 |
| | | | | 425/131.1 |
| 2015/0130117 A1* | 5/2015 | Lacaze | ................. | B29C 70/681 |
| | | | | 264/482 |
| 2016/0214321 A1* | 7/2016 | Tow | ................. | B29C 64/20 |
| 2016/0374431 A1* | 12/2016 | Tow | ................. | B33Y 30/00 |
| | | | | 36/43 |

OTHER PUBLICATIONS

Mei et al., "Continuous ink-jet printing electronic components using novel conductive inks", Solid Freeform Fabrication Proceedings, 2004, pp. 334-345.

"Conductive inkjet printable ink prints circuits directly on polyesters", retrieved from http://www.printedelectronicsworld.com/articles/2405/conductive-inkjet-printable-ink-prints-circuits-directly-on-polyesters, Jul. 1, 2010.

"The EX[1]—rapid 3D printing of circuit boards", retrieved from https://www.kickstarter.com/projects/cartesianco/the-ex1-rapid-3d-printing-of-circuit-boards, Nov. 11, 2013.

Songping, "Fabrication of Polymer Silver Conductor using Inkjet Printing", Dec. 24, 2008.

Camarchia et al., "Demonstration of inkjet-printed silver nanoparticle microstrip lines on alumina for RF power modules", Organic Electronics, 2014, pp. 91-98, 2014.

Nie et al., "Inkjet printing of silver citrate conductive ink on PET substrate." Applied surface science, 2012, pp. 554-560, 261.

"Introducing the Dragonfly 2020—Revolutionary 3D Printer for Professional PCB Electronics", retrieved from http://www.nano-di.com/3d-printer, 2015.

\* cited by examiner

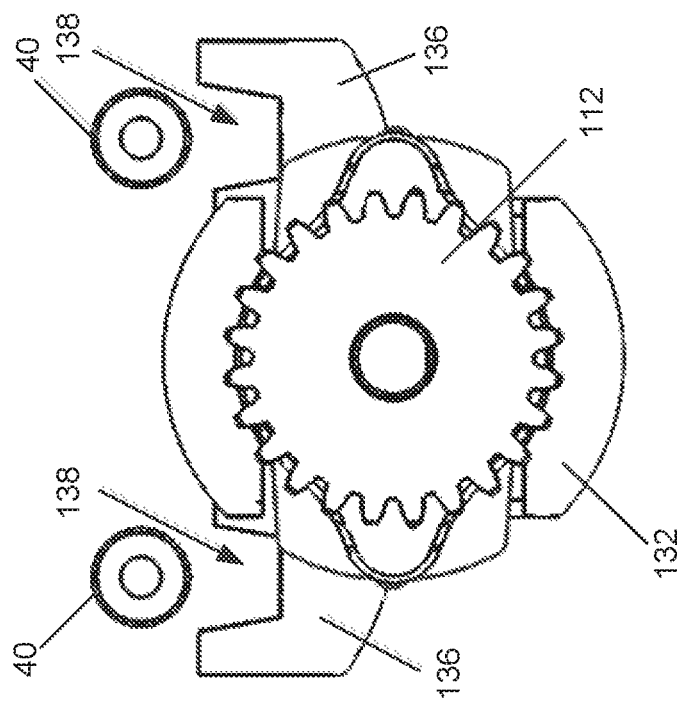
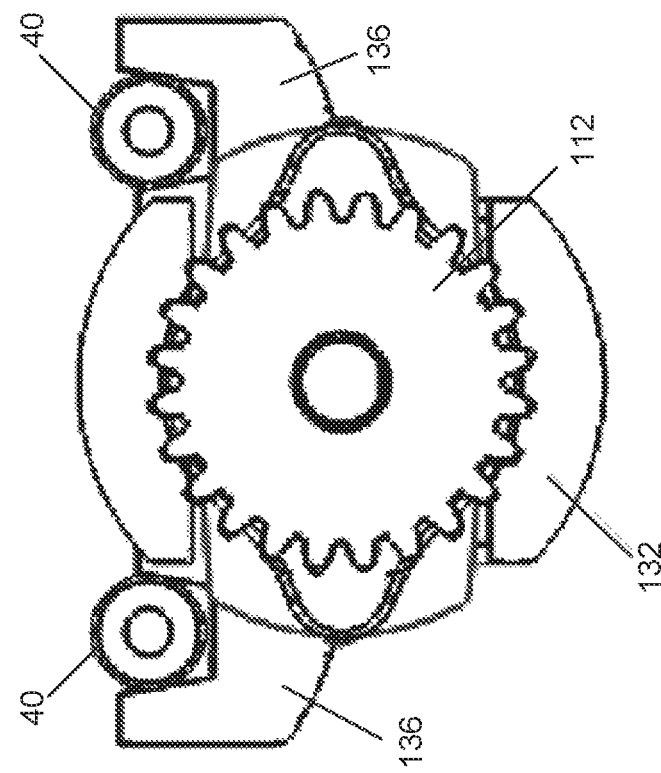

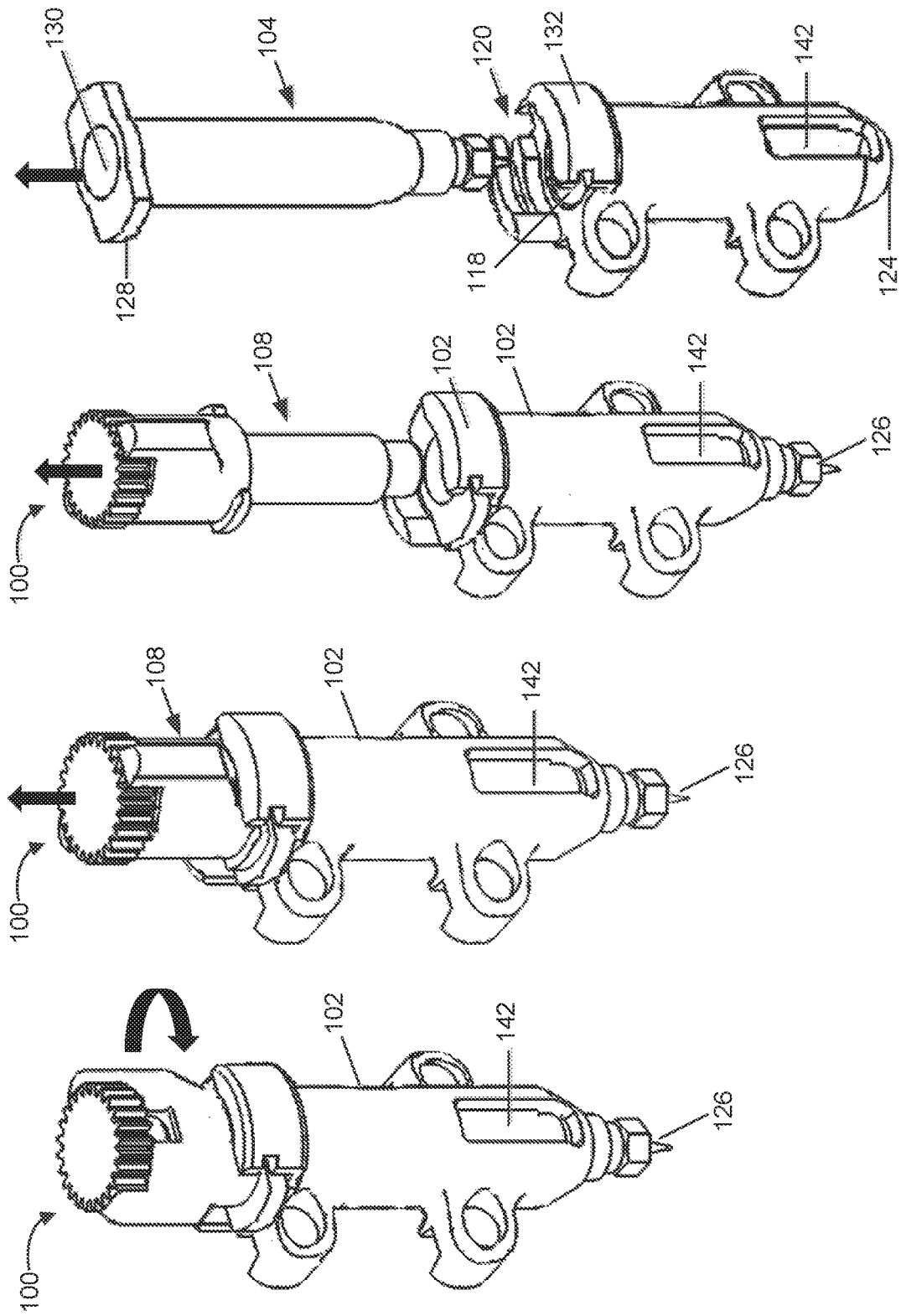

INTERCHANGEABLE FABRICATION HEAD ASSEMBLY

CROSS-REFERENCE TO RELATED APPLICATIONS

The present disclosure claims priority from U.S. provisional patent application No. 62/113,664 filed Feb. 9, 2015, the contents of which are incorporated herein by reference.

FIELD

The present disclosure relates generally to fabrication systems, such as circuit printing systems. More specifically, the present disclosure relates to an interchangeable fabrication head assembly for use in such systems.

BACKGROUND

The production of various objects and prototypes of objects, such as printed circuit boards (PCBs), can require the implementation of a variety of processing steps and material applications. Each such process and material application may require the use of different materials and tools for fabricating the object or prototype. Such varying combinations of tooling and materials can therefore require significant investments in equipment, or the use of costly and time-consuming third party fabrication services. Improvements to fabrication systems are therefore desirable.

SUMMARY

An aspect of the specification provides an interchangeable head for a fabrication system. The interchangeable head includes a fabrication module, a sheath for receiving and encasing the fabrication module, a control system for controlling the fabrication module during fabrication of an object, and a coupling mechanism for securely attaching and detaching the interchangeable head to a carriage mounted to the fabrication system.

The fabrication module may be removable from the sheath. The fabrication module may be lockable to the sheath when encased in the sheath.

The object may be a printed circuit board and the fabrication module may include a dispensing syringe for dispensing a dispensable material during fabrication of the printed circuit board.

The control system may include a dispensing system for controlling the dispensing of the dispensable material during fabrication of the printed circuit board. The dispensing syringe may include a compartment for receiving the dispensing system.

The dispensing system may include a rotary gear, a motion conversion system coupled to the rotary gear, and a plunger for coupling to the motion conversion system via a piston, wherein the motion conversion system is configured to convert rotational motion of the rotary gear to linear motion to move the plunger to dispense the dispensable material during fabrication of the printed circuit board.

The fabrication module may be encased in the sheath and affixed to the sheath. The fabrication module may include a touch probe. The fabrication module may include a drill head. The fabrication module may include a pick and place device.

The coupling mechanism may be a magnetic coupling mechanism for securely attaching to a complementary magnetic coupling mechanism of the print head carriage.

The magnetic coupling mechanism may include at least one pair of arms extending from the sheath, each arm comprising a magnet for securely attaching to a metal rod of the complementary magnetic coupling mechanism of the print head carriage.

An aspect of the specification provides a fabrication head assembly for a fabrication system. The fabrication head assembly includes a carriage comprising: a housing mountable to the fabrication system; a first coupling mechanism. The fabrication head assembly also includes an interchangeable head comprising: a fabrication module; a sheath for receiving and encasing the fabrication module; a control system attached to the fabrication module for controlling the fabrication module during fabrication of an object; and, a second coupling mechanism for securely attaching and detaching the interchangeable head to the first coupling mechanism of the carriage.

The fabrication module may be removable from the sheath. The fabrication module may be lockable to the sheath when encased in the sheath.

The object may be a printed circuit board, and the fabrication module may include a dispensing syringe for dispensing a dispensable material during fabrication of the printed circuit board and where the control system comprises a dispensing system for controlling the dispensing of the dispensable material during fabrication of the printed circuit board.

The dispensing syringe may include a compartment for receiving the dispensing system.

The dispensing system may include a rotary gear, a motion conversion system coupled to the rotary gear, and a plunger for coupling to the motion conversion system via a piston, wherein the motion conversion system is configured to convert rotational motion of the rotary gear to linear motion to move the plunger to dispense the dispensable material during fabrication of the printed circuit board.

The fabrication module may be encased in the sheath and affixed to the sheath and the fabrication module comprises one of a touch probe and a drill.

BRIEF DESCRIPTION OF THE DRAWINGS

Embodiments of the present invention will be described, by way of example, with reference to the drawings and to the following description, in which:

FIG. 7A is a top view of the print head assembly of FIG. 1, illustrating the print head attached to the print head carriage;

FIG. 7B is a top view of the print head assembly of FIG. 1, illustrating the print head of FIG. 2 detached from the print head carriage;

FIG. 8A-8D (also referred to collectively as FIG. 8) are perspective views, illustrating disassembly of the print head of the print head assembly of FIG. 1;

DETAILED DESCRIPTION

Figure 1:
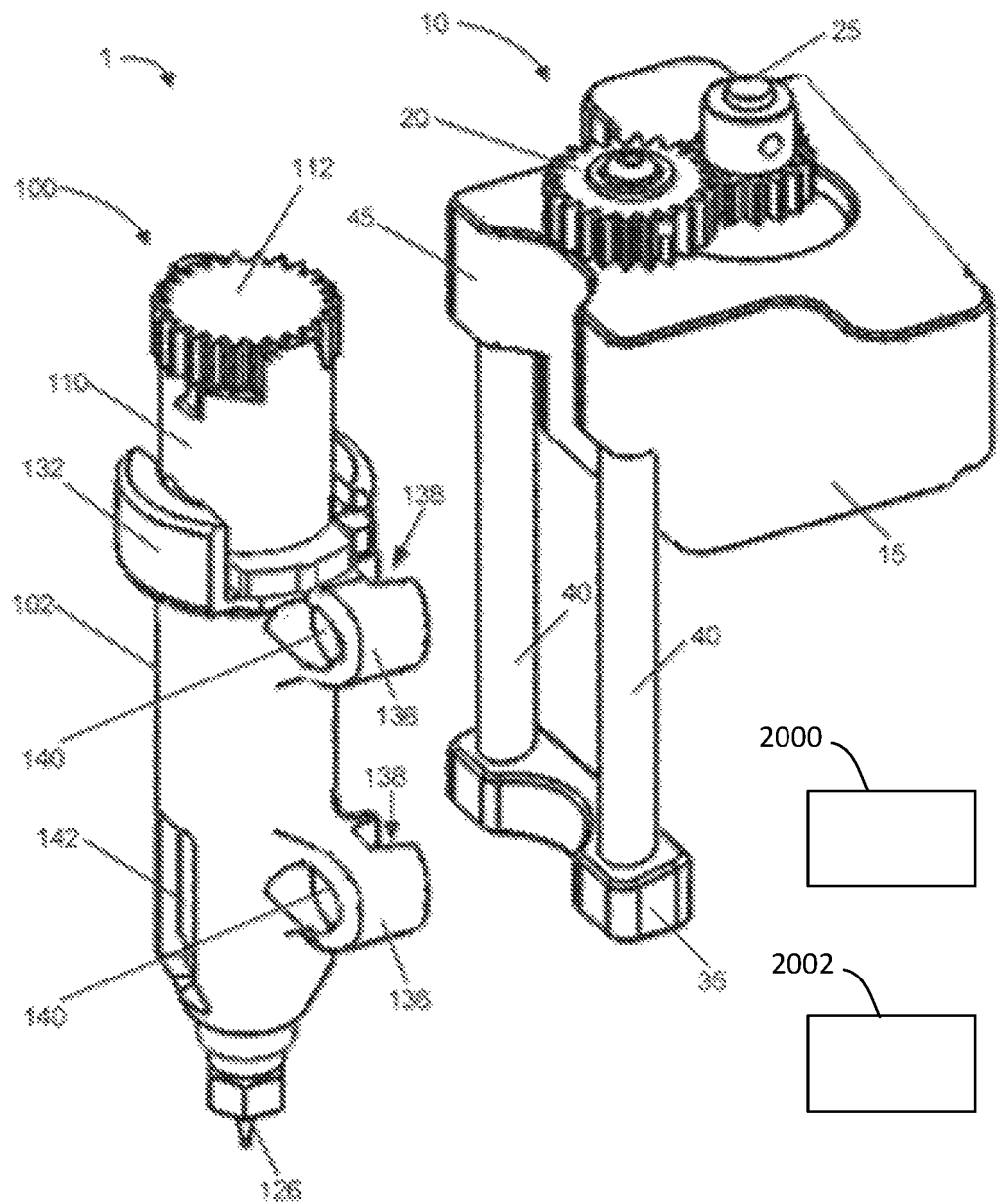
FIG. 1 is an exploded front perspective view of a print head assembly of a printing system that is capable of fabricating objects in accordance with an embodiment.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Referring to FIG. 1 to FIG. 8, an example embodiment of an interchangeable fabrication head assembly is shown. In the illustrated embodiment, the interchangeable fabrication head assembly is employed in conjunction with a printing system (not shown) for fabricating single layer or multilayer circuit boards using a direct-write deposition process. The interchangeable fabrication head assembly is therefore also referred to below as a "print head assembly", though it will be apparent throughout the discussion herein that the interchangeable fabrication head assembly can also be employed in other fabrication processes (both those that do involve, and those that do not involve, printing). Examples of such processes include 3D printing (e.g. by dispensing thermoplastic materials), and subtractive PCB or other fabrication (e.g. by milling an initial block or sheet of material).

When employed in direct-deposit circuit board fabrication, the print head assembly 1 is mounted to a printing system (not shown) that includes a support (e.g. a rigid platform) that holds a printing substrate. In particular, the print head assembly 1 is mountable to a gantry system or robotic manipulator which moves the print head assembly 1 over the printing substrate, in coordinated X, Y, and Z directions until a desired print pattern is deposited on the printing substrate when fabricating a circuit board using a direct-write deposition process. An example of a printing system which the print head assembly 1 may be used with is described in U.S. patent application Ser. No. 14/795,278, which is incorporated herein in its entirety by reference. However, it will be appreciated that print head assembly 1 is mountable to any suitable printing system, or indeed other fabrication systems (e.g. single- or multi-layer PCB fabrication systems, 3D printing systems and the like). For ease of understanding, the components of such a printing or other fabrication system are not illustrated or described in detail herein.

The print head assembly 1 includes a carriage, referred to in connection with the illustrated embodiment as a print head carriage 10, and an interchangeable fabrication head, referred to in connection with the illustrated embodiment as a print head 100. The interchangeable print head 100 is securely attachable to and detachable from the print head carriage 10 via complementary coupling mechanisms, described in further detail below.

Print head carriage 10 includes a housing 15, a rotary gear 20, a motor controlled drive mechanism 25, a coupling mechanism attachable to and detachable from a coupling mechanism of the interchangeable print head 100, and a support 35. The rotary gear 20 is disposed on the housing 15 and the motor controlled drive mechanism 25 is disposed within the housing 15. The motor controlled drive mechanism 25 is configured to drive the rotary gear 20 as described in further detail below. It is also contemplated that other mechanisms for driving the rotary gear 20 are contemplated, including a belt drive, chain drive, or other suitable mechanism. The carriage coupling mechanism, attachable to a complementary coupling mechanism of the interchangeable print head 100, includes a magnetically susceptible element, which in the present embodiment includes a pair of spaced apart parallel metal rods 40 that extend substantially downwards from a front face 45 of the housing 15 and terminate in the support 35. In other embodiments, a wide variety of configurations of magnetically susceptible elements may be implemented, including different numbers and orientations of rods 40. In addition, support 35 may be omitted in some embodiments (e.g. where the rods 40 are sufficiently stiff to avoid the need for reinforcement at their distal ends).

The interchangeable print head 100 includes a sheath, which in the present embodiment is also referred to as a syringe sheath 102. The print head 100 also includes a removable fabrication module, which in the present embodiment is a dispensing syringe 104 (see FIG. 8C) containing a dispensable material 106 (visible in FIG. 3). A wide variety of dispensable materials will occur to those skilled in the art. In the present example, the dispensable material is a flowable printed circuit board material. In other embodiments, the fabrication module 102 need not contain any dispensing material, as will be discussed below. The print head 100 also includes a control system; in the present example, the control system includes a removable dispensing system 108 for controlling the syringe 104 to dispense the dispensable material 106.

Figure 2:
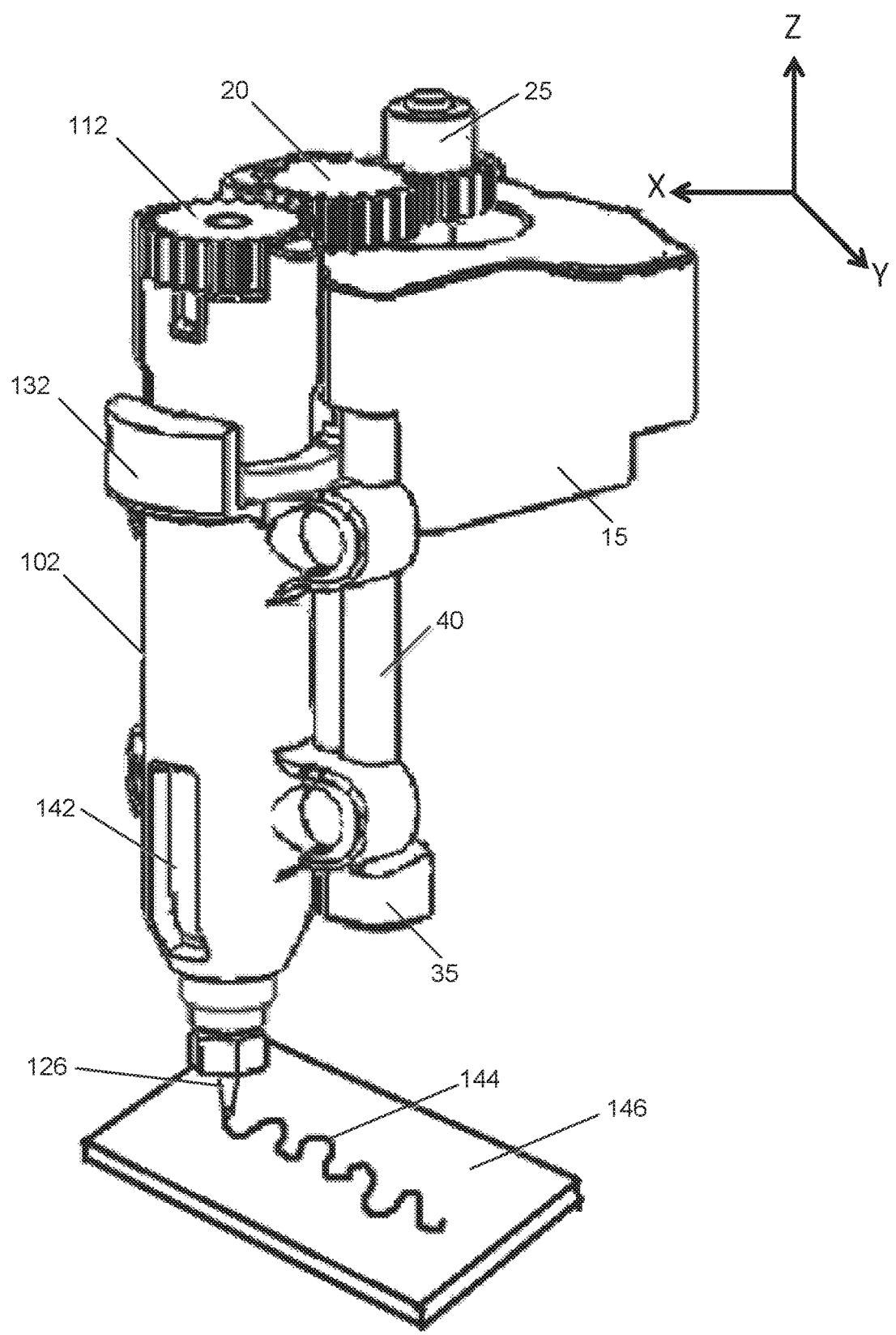
FIG. 2 is a front perspective view of the print head assembly of FIG. 1, with the print head of FIG. 1 attached to the print head carriage.
Figure 3:
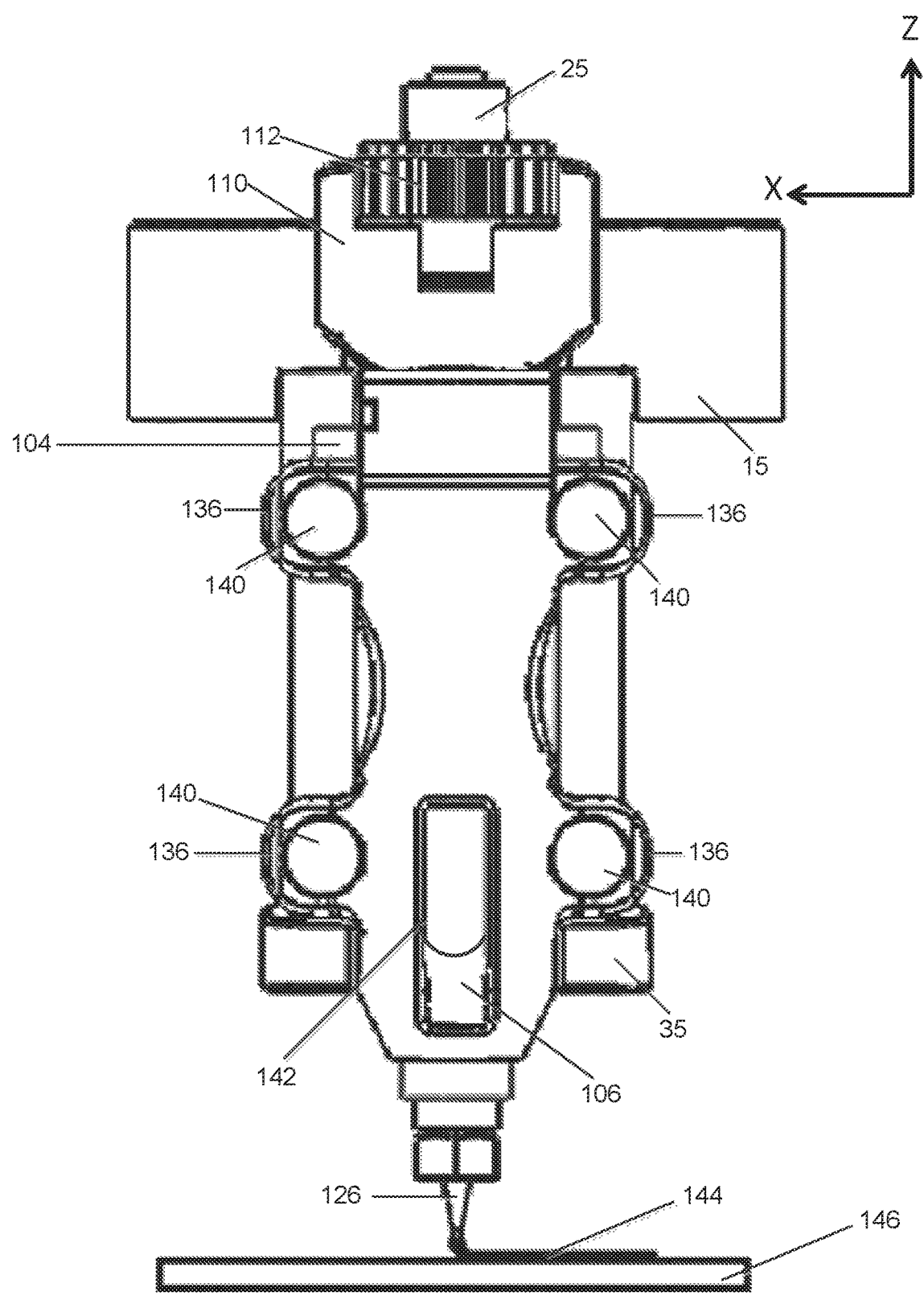
FIG. 3 is a front view of the print head assembly of FIG. 2, with the print head of FIG. 2 attached to the print head carriage.
Figure 4:
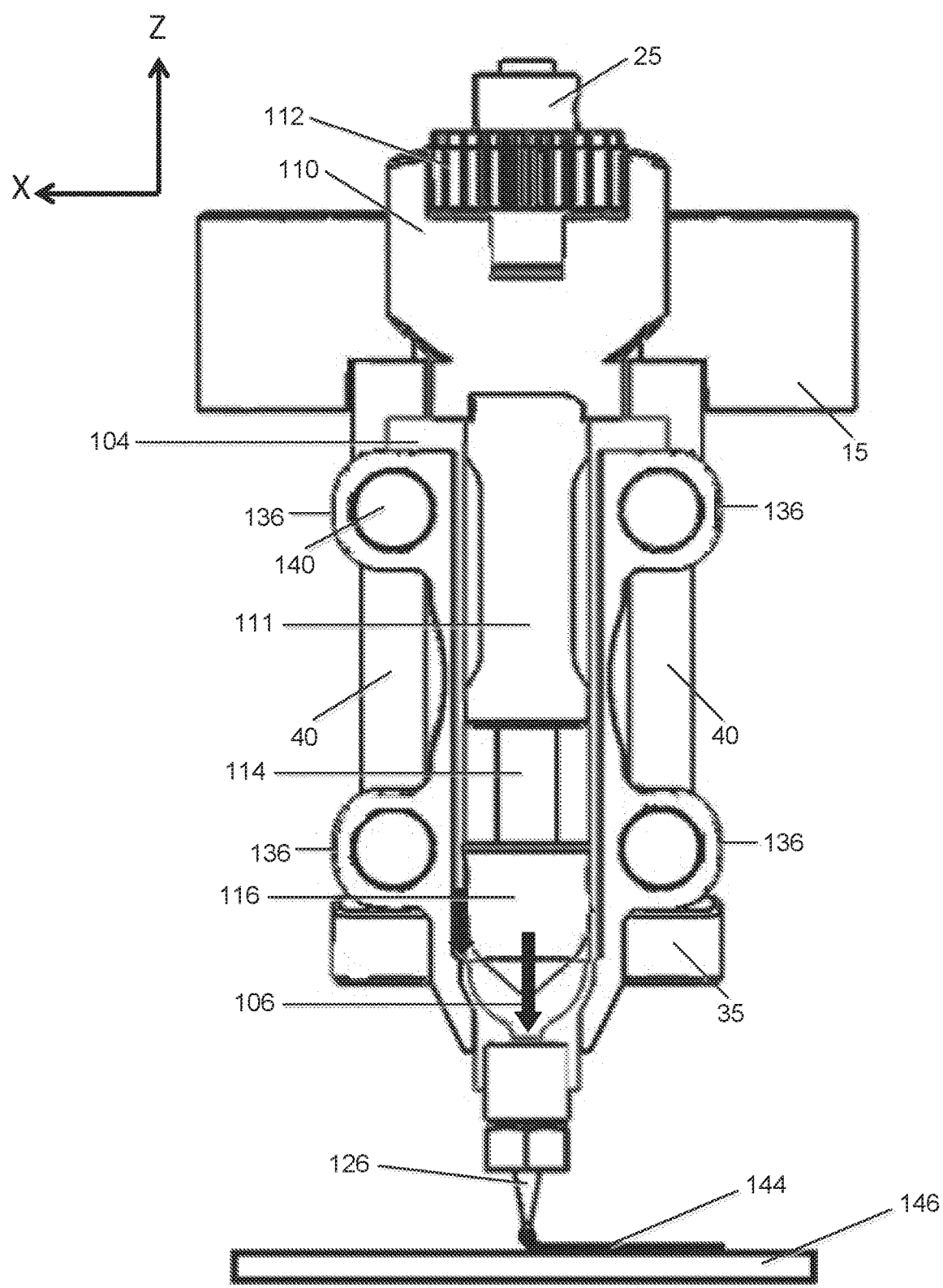
FIG. 4 is a partially cut away front view of the print head assembly of FIG. 3.

The removable dispensing system 108 (fully visible in FIG. 8C) includes a sheath cap 110, a rotary gear 112 disposed in the sheath cap 110, a motion conversion system 111 (see FIG. 4) coupled to the rotary gear 112, a drive piston 114 (see FIG. 4) coupled to the motion conversion system 111, and a mechanical plunger 116 (see FIG. 4) that can be coupled to and decoupled from the drive piston 114. The drive piston 114 and the mechanical plunger 116 are shaped and dimensioned to fit within an interior compartment 118 (see FIG. 8D) of the dispensing syringe 104 to dispense the dispensable material 106 therefrom. The motion conversion system 111 is configured to convert rotational motion of the rotary gear 112 into linear motion along the Z direction (as indicated in FIG. 2, among others). The motion conversion system 111 may include mechanical arrangements of gears, threaded rods and tapped elements. Such mechanical arrangements are known to those skilled in the art.

The syringe sheath 102 is shaped and dimensioned to encase the dispensing syringe 104 when the dispensing syringe 104 is inserted into the syringe sheath 102. The syringe sheath 102 is formed from any suitable solid and rigid material, such as plastic, metal, ceramic and the like, to provide a solid and rigid encasement which structurally supports the dispensing syringe 104 when the dispensing syringe 104 is encased within the syringe sheath 102. The syringe sheath 102 mechanically constricts movement of the dispensing syringe 104 when the dispensing syringe 104 is encased within the syringe sheath 102 to inhibit warping of the dispensing syringe 104 and mitigate offsetting of a desired print pattern during fabrication of a circuit board. As will now be apparent, in other applications (e.g. subtractive PCB fabrication, 3D printing), such encasement of a fabrication module by sheath 102 would similarly act to reduce or eliminate undesirable offsetting of other material applications or tooling actions.

The syringe sheath 102 has an inlet 120 (see FIGS. 8C and 8D) for receiving the dispensing syringe 104 and an outlet 124 through which an effector end, also referred to as a bottom end, of the dispensing syringe 104 protrudes when the dispensing syringe 104 is encased within the syringe sheath 102. The bottom end of the dispensing syringe 104 includes or is otherwise coupled to a dispensing nozzle 126 via any suitable attachment mechanism, such as, for example, a Luer lock mechanism. A nozzle cap (not shown) may be attached to the outlet of the dispensing syringe 104 to cover the dispensing nozzle 126 to protect the dispensing nozzle 126 from damage. The nozzle cap (not shown) may contain an anti-clogging material (e.g. a solvent) to inhibit the dispensable material 106 from drying out in the dispensing nozzle 126 when the interchangeable print head 100 is not in use for fabricating a circuit board (or any other object, in embodiments employed for 3D printing or other applications). The nozzle cap (not shown) may be attached using any suitable attachment mechanism, such as, for example, a snap fit mechanism, a twist fit mechanism, and the like.

The inlet 120 of the syringe sheath 102 forms a seat upon which a top end 128 (see FIG. 8D) of the dispensing syringe 104 rests when the dispensing syringe 104 is encased within the syringe sheath 102. The top end 128 of the dispensing syringe 104, in turn, forms a seat upon which the sheath cap 110 of the removable dispensing system 108 rests when the motion conversion system 111, the drive piston 114 and the mechanical plunger 116 of the removable dispensing system 108 are inserted into an interior compartment 130 of the dispensing syringe 104.

Extending from the inlet 120 of the syringe sheath 102 is a locking mechanism 132 for locking the sheath cap 110 of the removable dispensing system 108 to the syringe sheath 102. In the example embodiment shown in FIG. 1 to FIG. 8, the locking mechanism 132 is a twist fit locking mechanism similar to those utilized to fasten a conventional jar and lid. After insertion of the dispensing syringe 104 into the syringe sheath 102 and insertion of the removable dispensing system 108 into the interior compartment 130 of the dispensing syringe 104, the sheath cap 110 can be locked to the syringe sheath 102 by twisting the sheath cap 110 in one direction, such as, for example, a counter-clockwise direction, to engage flanges on the cap 110 (seen in FIG. 8C) with corresponding grooves in the locking mechanism 132. The dispensing syringe 104 may be unlocked by twisting the sheath cap 110 in the opposite direction, such as for example, a clockwise direction. Although the locking mechanism 132 shown in the embodiment of FIGS. 1 to 8 is a twist fit locking mechanism, it will be appreciated that any suitable locking mechanism may be utilized to lock the sheath cap 110 of the dispensing system 108 to the syringe sheath 102, such as for example, a press fit locking mechanism, a snap fit locking mechanism, and the like.

The syringe sheath 102 also includes a coupling mechanism for securely attaching and detaching the interchangeable print head 100 to and from the coupling mechanism of the print head carriage 10. In the example embodiment shown in FIG. 1, the coupling mechanism of the interchangeable print head 100 comprises four arms 136, two of which are visible in FIG. 1 (all four arms 136 are shown, for example, in FIGS. 3-5). Each arm 136 extends outwards substantially horizontally from the syringe sheath 102. Each arm 136 includes a groove 138 (also shown in FIG. 7B) shaped and dimensioned to surround one of the metal rods 40 of the print head carriage 10 when the interchangeable print head 100 is securely attached to the print head carriage 10. Each arm 136 also includes a magnet 140 embedded therein. The interchangeable print head 100 is securely attachable to the print head carriage 10 by placing the grooves 138 of the arms 136 around one of the metal rods 40 so that the magnets 140 in each arm 136 magnetically couple to the metal rods 40. The interchangeable print head 100 is detachable from the print head carriage 10 by applying a force that overcomes the magnetic coupling between the magnets 140 and the metals rods 40.

It will be appreciated that although the example embodiment of FIG. 1 to FIG. 8 shows a coupling mechanism with four arms 136, the coupling mechanism may include any suitable number of arms 136. It will also be appreciated other arrangements of arms 136 and magnets 140 that enable the interchangeable print head 100 to be attached to and detached from the print head carriage 10 are within the scope of the present invention.

The syringe sheath 102 of the interchangeable print head 100, the front face 45 of the housing 15 of the print head carriage 10, and the support 35 of the print head carriage 10 are complementarily shaped to restrict undesirable movement of the interchangeable print head 100 throughout printing, and to ensure a substantially repeatable fit each time the interchangeable print head 100 is attached to the print head carriage 10. The syringe sheath 102 of the interchangeable print head 100, the front face 45 of the housing 15 of the print head carriage 10, and the support 35 of the print head carriage 10 are also shaped to ensure alignment between the rotary gear 20 of the print head carriage 10 and the rotary gear 112 of the interchangeable print head 100 upon attachment of the interchangeable print head 100 to the print head carriage 10, thus providing control of the dispensing system 108, in the present example to dispense flowable PCB material to fabricate a circuit board.

The complementary coupling mechanisms shown in embodiment of FIG. 1 to FIG. 8 are to be taken as examples only. Any suitable complementary coupling mechanisms may be utilized for securely attaching the interchangeable print head 100 and detaching the interchangeable print head 100 to and from the print head carriage 10 while limiting undesirable shift of the interchangeable print head 100 and providing substantial alignment between rotary gears 20, 112. Examples of other suitable complementary coupling mechanisms include, but are not limited to, complementary mechanical coupling mechanisms, such as interference fitting. Securing elements other than the magnetic elements discussed above are also contemplated. For example, the magnets 140 can be replaced or supplemented with adhesives, mechanical clips, and the like. In further embodiments, the magnets 140 (or any other suitable securing element) can be located on the carriage 10 while the rods 40 can be located on the interchangeable head 100.

In the example embodiment shown in FIG. 1 to FIG. 8, the syringe sheath 102 also includes a transparent fill window 142 which enables a user to view a fill level of dispensable material 106 within the dispensing syringe 104. In an alternative embodiment, the syringe sheath 102 may not include the transparent fill window 142, but rather may be transparent (along with the syringe 104 itself) to enable viewing of the dispensable material 106. In another alternative embodiment, either or both of the syringe sheath 102 and the syringe 104 may be opaque.

The operation of the removable dispensing system 108 will now be described with reference to FIG. 5 to FIG. 6. When the interchangeable print head 100 is securely attached to the print head carriage 10 by the complementary coupling mechanisms of the interchangeable print head 100 and the print head carriage 10, the motor controlled drive mechanism 25 of the print head carriage 10 rotates the rotary gear 20 of the print head carriage 10, which in turn rotates rotary gear 112 of the dispensing system 108. The motor controlled drive mechanism 25 rotates rotary gear 20 of the print head carriage 10 to generate rotations within the rotary gear 112 of the dispensing system 108. Rotational motion of the rotary gear 112 is converted to linear motion, through the motion conversion system 111, which drives the drive piston 114 downwardly in the linear (Z) direction to cause vertical linear displacement of the mechanical plunger 116.

Figure 5:
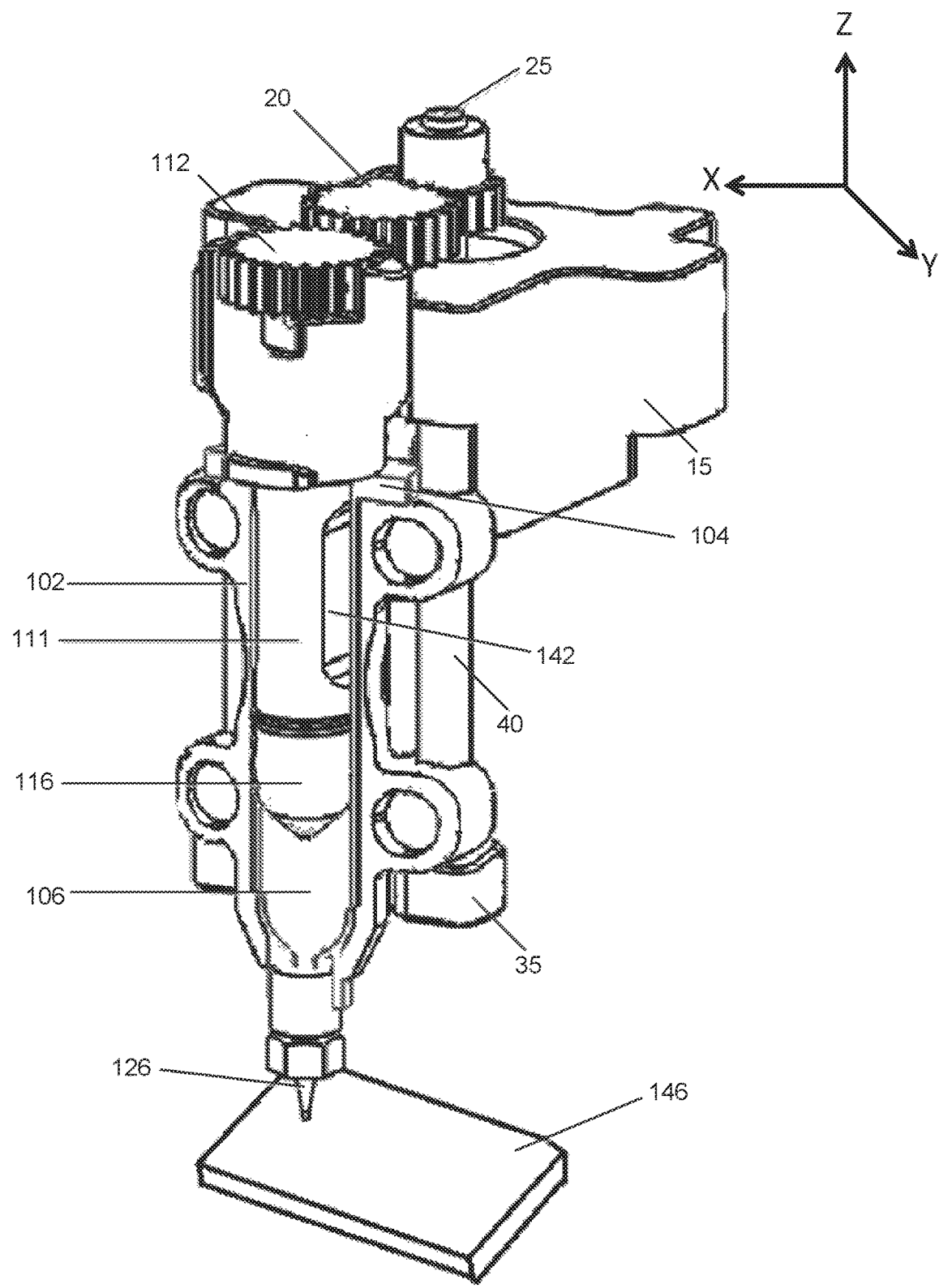
FIG. 5 is a partially cut away front perspective view of the print head assembly of FIG. 2.
Figure 6:
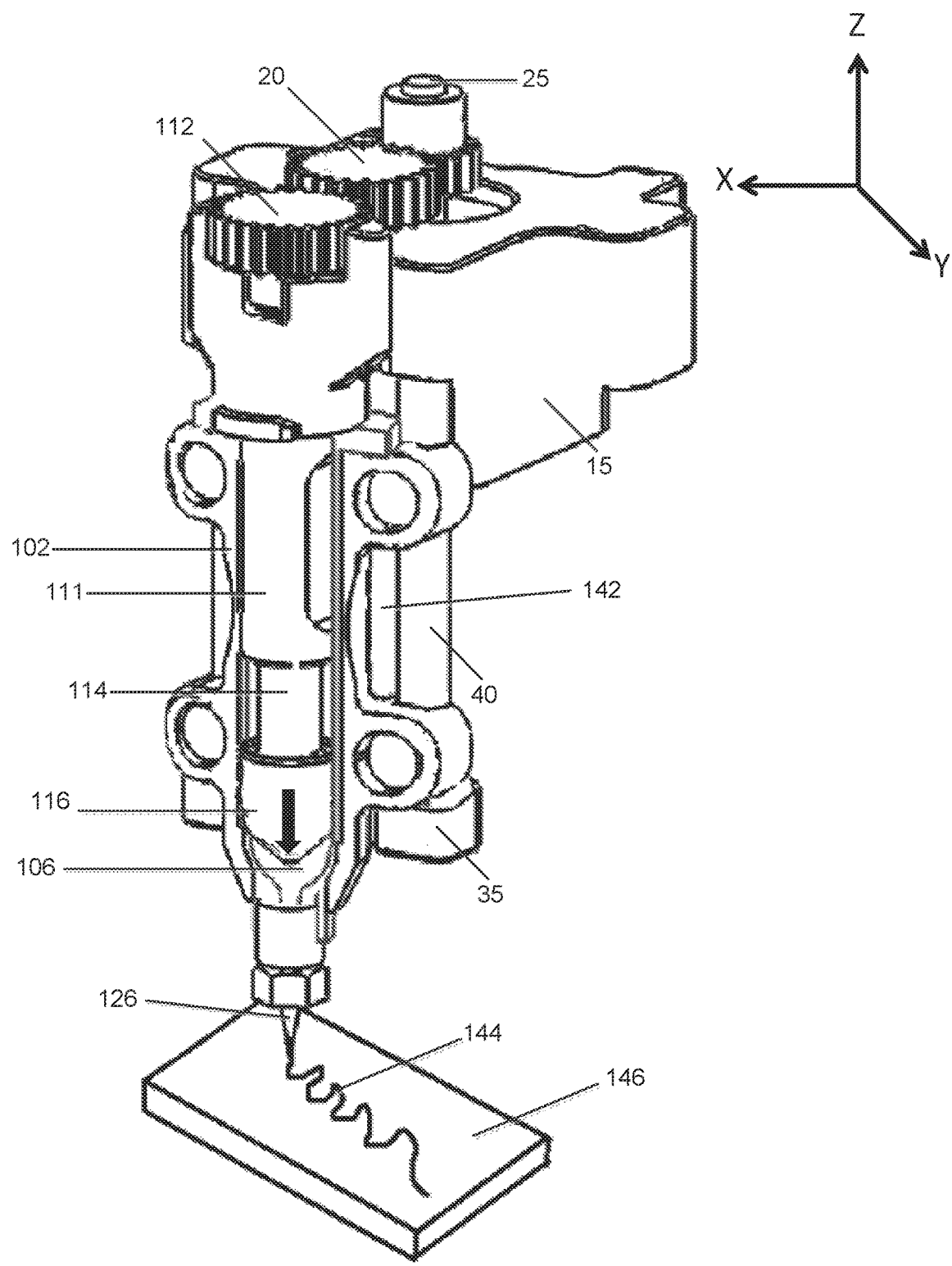
FIG. 6 is a partially cut away front perspective view of the print head assembly of FIG. 2 during operation.

FIG. 5 shows the dispensing system 108 in a stationary state with the drive piston 114 fully retracted. FIG. 6 shows the drive mechanism 25 in operation generating rotations within the rotary gears 20, 112 and producing controlled downward movement of the drive piston 114 in the Z direction. The controlled downward movement of the drive piston 114 in the Z direction displaces the mechanical plunger 116 and applies a substantially downward force onto the dispensable material 106 to extrude the dispensable material 106 out of the dispensing nozzle 126 to form a desired print pattern 144 on a printing substrate 146 (also shown in FIG. 2).

It will be appreciated that the removable dispensing system 108 described in the present embodiment is by way of example only. Other mechanical arrangements that fundamentally establish a pressure on the dispensable material 106 to promote dispensing are within the scope of the present disclosure.

The assembly and disassembly of the interchangeable print head 100, which facilitates replacement of the dispensable syringe 104, will now be described with reference to FIG. 8A to FIG. 8D. FIG. 8A depicts the interchangeable print head 100 in an assembled state. To disassemble the interchangeable print head 100, the sheath cap 110 is twisted in a clockwise direction to release the flanges of the sheath cap 110 from the grooves of the locking mechanism 132. The dispensing system 108 is then withdrawn from the dispensing syringe 104 by pulling the sheath cap 110 in a vertical direction in the Z direction away from the inlet 120 of the syringe sheath 102 as shown in FIG. 8B to provide access to the dispensing syringe 104 residing within the syringe sheath 102. FIG. 8C depicts the dispensing system 108 withdrawn from the dispensing syringe 104. Once the dispensing system 108 is withdrawn from the dispensing syringe 104, the dispensing syringe 104 may be withdrawn from the syringe sheath 102 by pulling the dispensing syringe 104 out from the syringe sheath 102. FIG. 8D depicts the dispensing syringe 104 withdrawn from the syringe sheath 102 without the dispensing system 108. The disassembled state of the interchangeable print head 100 is depicted in FIG. 8D. Dispensing syringe 104 may be replaced when the dispensing syringe 104 is empty (i.e., the dispensable material 106 is used up), or when an alternative dispensable material 106 is desired for fabricating a circuit board using a direct-write deposition process. Once the dispensing syringe 104 has been replaced, the interchangeable print head 100 may be reassembled in reverse order to that shown in FIGS. 8A-8D, and attached to the print head carriage 10 using the complementary coupling mechanisms of the interchangeable print head 100 and the print head carriage 10.

The operation of the print head assembly 1 when mounted to a printing system for fabricating a circuit board using a direct-write printing process will now be described with reference to FIG. 1 to FIG. 8. Following a direct-write printing process, the dispensable material 106 encapsulated within the dispensing syringe 104 is extruded through the dispensing nozzle 126 to deposit a desired print pattern 144 onto a printing substrate 146. Such dispensable materials can be, but are not limited to: polymer thick films (PTFs), insulating polymer pastes, solder pastes, molten plastics, ceramics and the like. Utilizing a conductive polymer thick film as the dispensable material 106, a direct-write printing process can be employed to print circuit boards for rapid prototyping applications. As will now be apparent, applications other than circuit board fabrication are also contemplated, such as 3D printing by extrusion of thermoplastics or the like.

Figure 9:
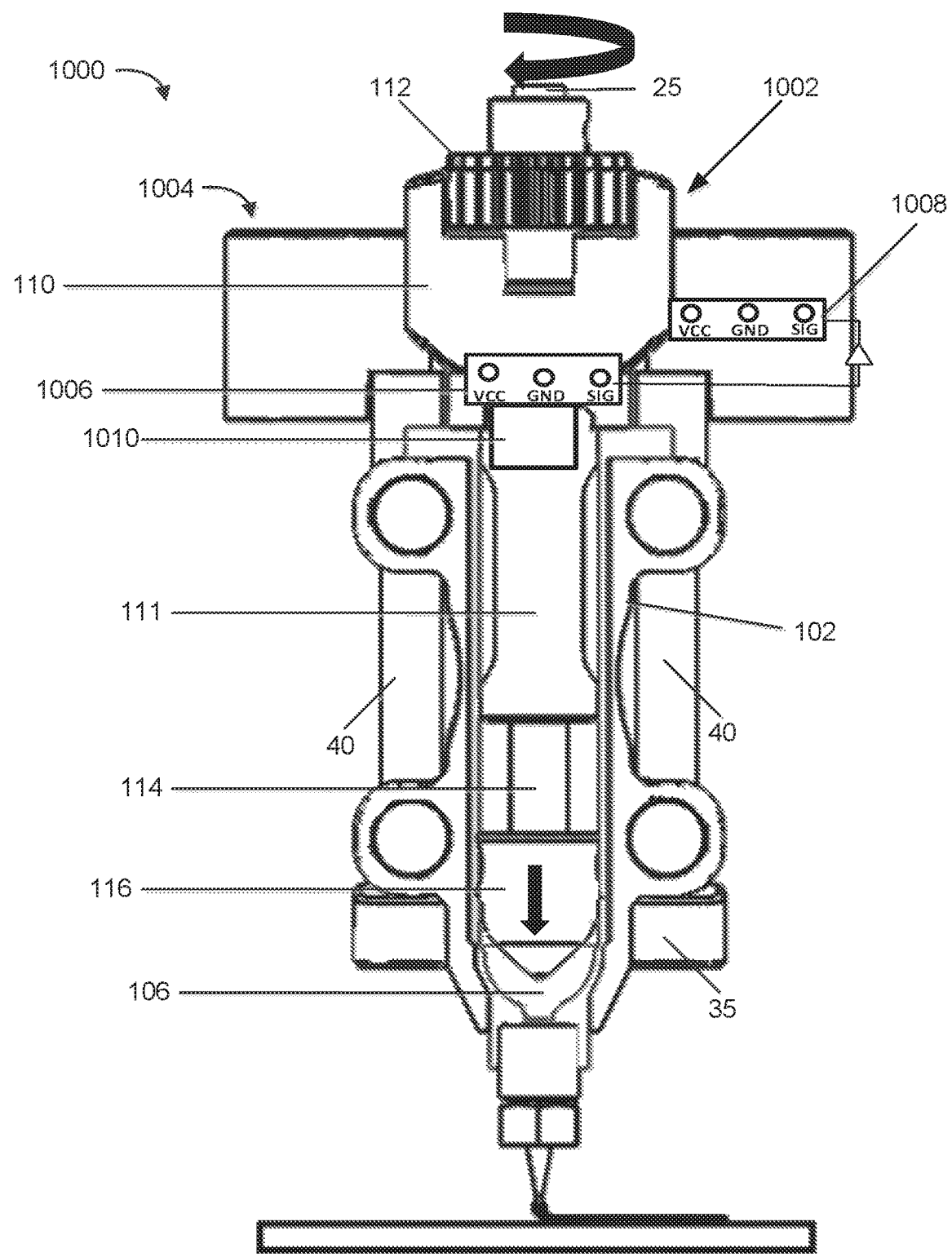
FIG. 9 is a partially cut-away front view a print head assembly in accordance with another embodiment.

Referring now to FIG. 9, another example embodiment of a print head assembly 1000 is shown. The print head assembly 1000 establishes an electrical connection between an interchangeable print head 1002 and a print head carriage 1004. The interchangeable print head 1002 is similar to the interchangeable print head 100 described above. The interchangeable print head 1002, however, includes a print head printed circuit board (PCB) 1006 in the sheath cap 110 of the syringe sheath 102. A complementary carriage PCB 1008 is mounted to the print head carriage 1004, in a position such that when the print head 1002 is securely attached to the print head carriage 1004, the electrical contact points, power (VCC), ground (GND), and signal (SIG) of the print head PCB 1006 and the electrical contact points power (VCC), ground (GND), and signal (SIG) of the carriage PCB 1008 contact each other and create an electrical connection between the head 1002 and the carriage 1004. The electrical connection depicted in FIG. 9 has only been illustrated figuratively; the specific physical locations of the coupling PCBs may vary, as will be discussed below.

The complementary coupling mechanisms of the interchangeable print head 1002 and the print head carriage 1004, which are as described above in connection with FIGS. 1 to 8, can guide the print head PCB 1006 and carriage 1008 into proper alignment to establish contact between the electrical contact points VCC, GND, SIG, hence establishing electrical contact.

The electrical connection between the interchangeable print head 1002 and the print head carriage 1004 enables the print head assembly 1000 to serve as a distinct active or passive entity in the fabrication system (e.g. the above-mentioned printing system including a gantry system or robotic manipulator), controlling the operation of the print head assembly 1000. For example, the interchangeable print head 1002 can contain an electrical system that can interface with an electrical system of the print head carriage 1004, which in turn can communicate with and be controlled by the printing system for applications that include, but are not limited to, sensing, feedback control, I/O communication, electrical power transmission, and other such applications. It will be appreciated that although the print head and carriage PCB's 1006, 1008 depicted in FIG. 9 includes only one signal contact (SIG), the print head PCB 1006 and carriage PCB 1008 may include any suitable number of signal contacts (SIG) for controlling the print head assembly 1000. The number of signal contacts (SIG) included in the print head PCB 1006 and carriage PCB 1008 depends on the applications provided by the printing system and/or print head carriage 1004.

The above-mentioned electrical system of the print head carriage 1004 can operate to detect the presence of the interchangeable print head 1002 when the interchangeable print head 1002 is securely attached to the print head carriage 1004. The associated printing or other fabrication system can notify a user of the printing system, via an LED, electrical signal or sound for example, that the interchangeable print head 1002 is attached to the print head carriage 1004. Such an embodiment can consist of, for example, a normally open circuit within the electrical system of the print head carriage 1004 that is closed when the electrical contact points VCC, GND, SIG of the interchangeable print head 1002 come in contact with the electrical contact points VCC, GND, SIG of the print head carriage 1004.

In another embodiment of the present invention, the printing system, using the electrical system of the print head carriage 1004, can automatically calibrate or control dispensing parameters of the interchangeable print head 1002, through feedback aspects of the dispensing system. The electrical systems of the interchangeable print head 1002 and the print head carriage 1004 can include calibration and feedback systems which sense and control an applied force within the dispensing syringe 104 to control dispensing of the dispensable material 106 contained within the dispensing syringe 104 in the interchangeable print head 1002.

In still another embodiment, the dispensing system of the interchangeable print head 1002 can comprise an electric motor coupled to the drive piston 114 for driving the drive piston 114 in the linear Z direction to generate linear displacement in the mechanical plunger 116. The electric motor may be coupled to the electrical system of the interchangeable print head 1002 and controlled by the printing system via the electrical system of the interchangeable print head carriage 1004 when the interchangeable print head 1002 is attached to the print head carriage 1004 using the signal SIG contacts of the electrical connection. It will be appreciated that in this embodiment, the rotary gears 20, 112 and the motor controlled drive mechanism 25 may be omitted from the print head 1002 and the print head carriage 1004.

Referring again to FIG. 9, a dispensing system of the interchangeable print head 1002 includes the components of the dispensing system 108 described above, and also includes a Force Sensing Resistor (FSR) 1010. In such an arrangement, the FSR 1010 can be fixed in between the print head PCB 1006, and the motion conversion system 111. When the interchangeable print head 1002 is securely attached to the print head carriage 1004, and hence engaged with the electrical system through the electrical contacts VCC, GND, SIG, the printing system to which the print head assembly 1000 is mounted can detect a change in force whenever the drive piston 114 is displaced to extrude the dispensable material 106. The change in force detected by the FSR 1010, can be interpreted as a change in electrical resistance by the engaged electrical system, and can be used in a feedback control system to establish a constant force or pressure within the dispensing syringe 104.

This can be achieved by use of a controller within the associated printing or other fabrication system, such as a microcontroller or distinct control module that monitors a change in electrical resistance. The controller can also be housed in the carriage 1004 or the head 1002. The sensed resistance can be compared against a desired reference resistance (e.g. stored in a memory), corresponding to a force which results in optimal dispensing characteristics. The controller can then displace the drive piston 114, via the elements of the dispensing system 108, in such a way as to result in a higher or lower force, continuously adjusting such that the sensed resistance will converge to the desired reference resistance. Other embodiments can include, but are not limited to, an in-line pressure sensor or in-line mass flow sensor that can be integrated in such a system to similarly control the fluid pressure or fluid flow rate of the dispensable material 106, respectively.

Other methods of controlling the pressure exerted on the dispensable material 106, within interchangeable print head 1002 that is electrically coupled to the carriage 1004, will now be apparent to those skilled in the art.

The above disclosure portrays an interchangeable print head assembly 1000 that may be used with a compatible printing system that uses a direct write printing process to fabricate circuit boards, such as the system described in U.S. patent application Ser. No. 14/795,278. The interchangeable print head assembly 1000 can also be used with any other compatible fabrication system, including direct-deposit 3D printing systems. The interchangeable print head 1002 described herein facilitates quickly interchanging the print head 1002 when fabricating multilateral 3D objects using a 3D printer (e.g. to switch materials being applied, or to equip the fabrication system with any suitable required tooling).

It should further become evident that the above disclosure, directly relating to the method of printing circuitry in conjunction with U.S. patent application Ser. No. 14/795,278, is applicable to convenient interchangeability of various dispensable materials 106 required when fabricating circuit boards using a direct-write process. Conductive and insulating polymers can be rapidly interchanged for fabricating/printing multilayer circuit boards, in addition solder paste materials can be interchanged for dispensing onto pad locations for component attachment.

An example of further tooling that would benefit from an interchangeable form factor, as demonstrated by the embodied interchangeable print head 1002, can be an interchangeable height sensing touch probe for establishing a height contour of the printing substrate prior to dispensing. This can be directly applicable to the method of printing circuitry described in U.S. patent application Ser. No. 14/795,278, where a touch probe is initially mounted to the gantry system to create a height map of the printing substrate, and later can be replaced with a print head which utilizes the generated height map to maintain a constant printing distance between the nozzle and printing substrate.

Figure 10:
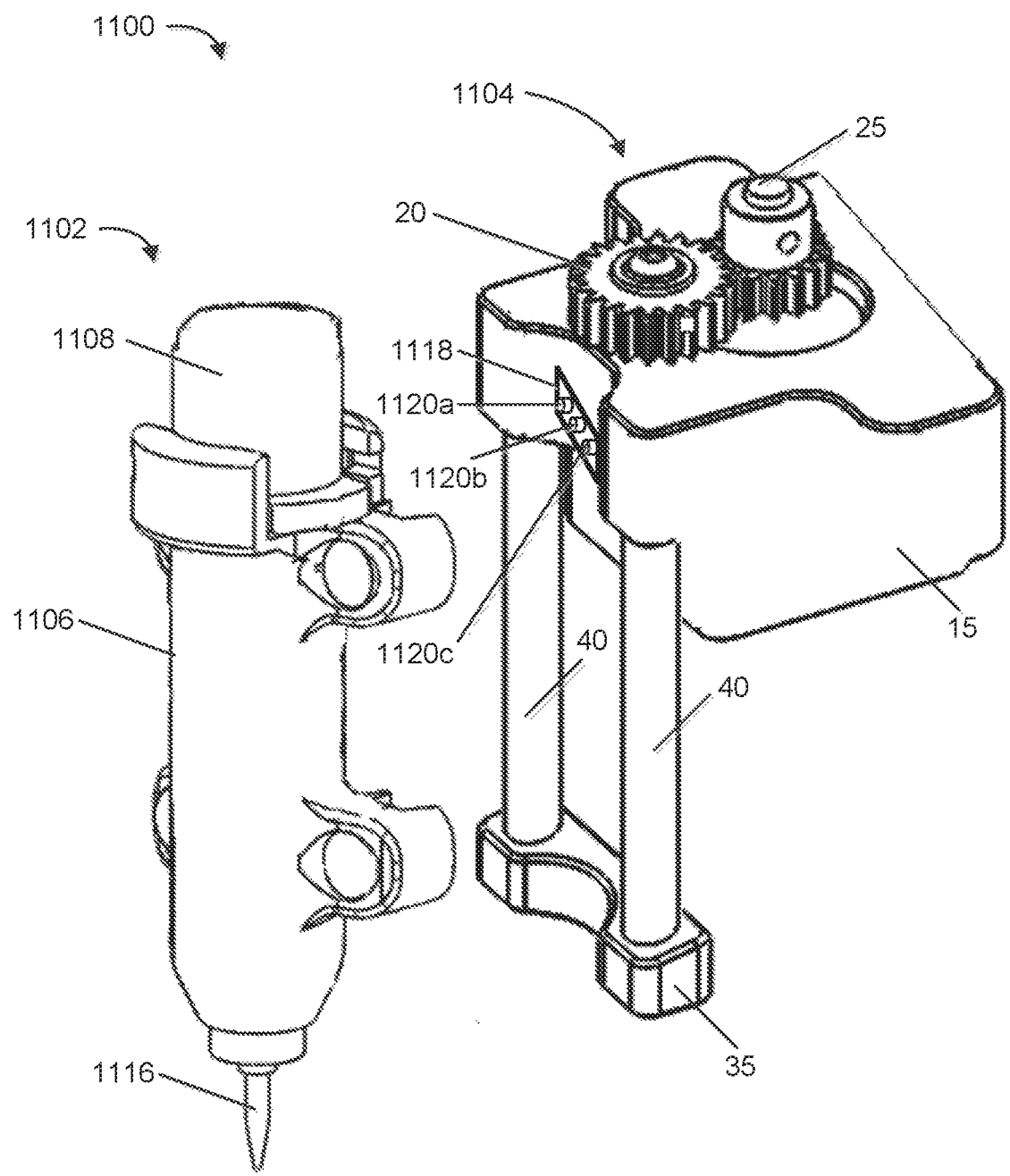
FIG. 10 is a front perspective view of a print head assembly in accordance with still another embodiment.
Figure 11:
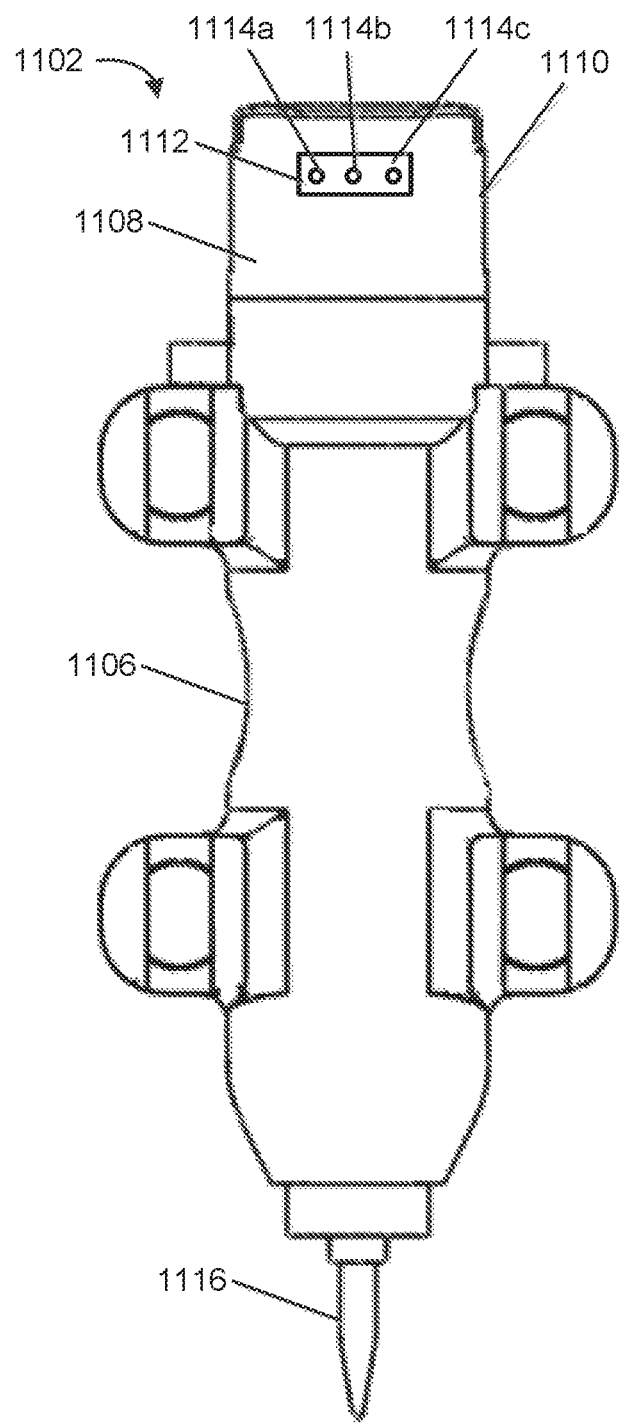
FIG. 11 is a rear view of a print head of the print head assembly of FIG. 10 in accordance with an embodiment.

Referring to FIG. 10 and FIG. 11, another example embodiment of an interchangeable fabrication head assembly is shown as 1100. The head assembly 1100 includes an interchangeable head 1102 and a carriage 1104. The carriage 1104 is similar to the print head carriage 10 described with reference FIG. 1 to FIG. 8, and hence is not described in further detail below, with the exception of certain additional features of the carriage 1104. The interchangeable head 1102 includes a sheath 1106 and a removable touch probe 1108. The sheath 1106 encases the touch probe 1108 when inserted into the sheath 1106. The touch probe 1108 may be removable from the sheath 1106 to facilitate replacement of the touch probe 1108 (with other sensing hardware or tooling, or with a dispensing syringe as described above). Alternatively, the touch probe 1108 may be affixed to the sheath 1106 (e.g. substantially permanently). The sheath 1106 is similar to the sheath 102 described in relation to FIG. 1 to FIG. 8 and is thus not described in detail further. Also, the interchangeable head 1102 attaches and detaches from the carriage 1104 using similar complementary coupling mechanisms as described in relation to FIG. 1 to FIG. 8, which are not therefore described in detail below.

The touch probe 1108 includes a probe cap 1110 that has a probe printed circuit board (PCB) 1112 with electrical contact points 1114a, 1114b, 1114c and a touch probe tip 1116. FIG. 11 shows a rear view the interchangeable head 1102 in isolation with the electrical contact points 1114a, 1114b, 1114c of the probe PCB 1112 exposed.

As will now be apparent to those skilled in the art, in the example embodiment shown in FIG. 10 and FIG. 11, the touch probe 1108 is another example of a fabrication module, and the probe PCB 1112 is another example of a control system for controlling the touch probe during a fabrication process (e.g. the fabrication of a single layer or multilayer circuit board).

Referring again to FIG. 10, the carriage 1104 also includes a carriage PCB 1118 having electrical contact points 1120a, 1120b, 1120c. When the interchangeable head 1102 is attached to the carriage 1104, the probe PCB 1112 contacts the carriage PCB 1118 and an electrical connection is formed between electrical contact points 1114a, 1114b, 1114c and electrical contact points 1120a, 1120b, 1120c, respectively.

The probe cap 1110 contains the probe PCB 1112 and further electrical and mechanical internals related to functions of the touch probe 1108. The touch probe tip 1116 can detect height points on a printing surface as a gantry system dictates the interchangeable head 1102 motion over the surface. Although the sheath 1106 of the interchangeable head 1102 resembles the sheath 102 that of the interchangeable print head 100 (and indeed, the two sheaths can be exactly the same sheath, in some embodiments), the heads 1102 and 100 have different functionalities by virtue of their fabrication modules (i.e. touch probe 1108 and syringe 104): height sensing and dispensing, respectfully. Hence, both height sensing of the printing surface and printing can be accomplished by the same system by interchanging between the applicable tooling.

When the interchangeable head 1102 is securely attached to the carriage 1104, the coupling mechanisms of the interchangeable head 1102 and the carriage 1104 align the electrical contact points 1114a, 1114b, 1114c and electrical contact points 1120a, 1120b, 1120c, respectively to establish an electrical connection therebetween. This introduces another example of feedback control for automatic calibration between the interchangeable apparatus and gantry system.

Such automatic calibration can measure the triggering position of the touch probe. In cases where such a height calibration mechanism requires a known displacement to trigger, the interchangeable touch probe apparatus can function as an entity within the electrical system to automatically calibrate this displacement. One such embodiment of this application uses an electrically conductive and electrically biased touch probe tip 1116 which can come in contact with an electrically conductive component of the printing system. This contact can create a closed electrical connection that can be detected through the aligned electrical contact points 1114a, 1114b, 1114c and electrical contact points 1120a, 1120b, 1120c between the interchangeable touch probe apparatus and the carriage 1104. The touch probe 1108 can then be further displaced to trigger. Measuring the displacement required between the initial connection and the triggering of the touch probe 1108 yields the known trigger distance, which can then be used to calibrate the printing system for further height sensing.

As mentioned earlier, two or more of the interchangeable heads described herein can be interchanged to allow for dependent, or mutually exclusive functionalities to be controlled by the same gantry system of a printing system by interchanging between the two or more interchangeable heads.

For example, contrary to the additive manufacturing technique employed by material deposition via an interchangeable print head, a rapid prototyping protocol can call for a subtractive approach in which a mill or drill head 2000 of FIG. 1 (shown schematically) would be appropriate. In this example embodiment, a fabrication module including a drill head 2000 can be placed within a sheath (e.g. sheath 102) and interchanged with the above-mentioned dispensing and sensing modules when needed, hence allowing both additive and subtractive manufacturing to be performed by the same fabrication system. Control of a drill head 2000 can be effected by mechanical arrangements (e.g. the gearing arrangements of FIGS. 1-8), electrical connection (e.g. the interconnected PCBs of FIGS. 10 and 11), or both.

Such an interchangeable drill attachment can be directly applicable to the circuit board prototyping method, where holes known as vias can be required to be drilled through the printing substrate after the printing materials have been deposited.

An interchangeable print head described herein allows for multifunctional tooling, whereas allowing one gantry system of a fabrication system to conduct fabrication of a circuit board, and post drilling of the vias by simply swapping the interchangeable print head with the required tooling throughout the workflow.

Additional examples may include an interchangeable head that can function as a pick and place attachment 2002 of FIG. 1 (shown schematically), and can be mounted onto a gantry system or robotic manipulator of a fabrication system to place electrical components on the prototyped circuitry. Furthermore, a camera attachment can be included as an interchangeable apparatus to inspect an object post printing.

It will be appreciated that although the example embodiments of the fabrication head assembly is used in conjunction with a fabrication system for fabricating circuit boards, the fabrication head assembly and interchangeable fabrication head can be used with any suitable three-dimensional (3D) printer for fabricating 3D objects. The interchangeable head can include a sheath, a removable fabrication module, and a control system as described herein. The fabrication module may dispense any suitable dispensable material, such as, for example, polymers, epoxies, fluid ceramics and metals, and thermoplastics. The fabrication module is removable and thus can be swapped with a drill attachment to mill undesirable areas off of the 3D object during fabrication.

It will also be appreciated that the above description relates to the embodiments by way of example only. Many variations on the disclosure will be obvious to those knowledgeable in the field, and such obvious variations are within the scope of the disclosure as described and claimed, whether or not expressly described. The terms top, bottom, downward, upward, vertical, and horizontal are utilized herein to provide reference to the orientation of the print head assembly in use.

In the preceding description, for purposes of explanation, numerous details are set forth in order to provide a thorough understanding of the embodiments. However, it will be apparent to one skilled in the art that these specific details are not required. The above-described embodiments are intended to be examples only. Alterations, modifications and variations can be effected to the particular embodiments by those of skill in the art without departing from the scope, which is defined solely by the claims appended hereto.

What is claimed is:

1. A fabrication system comprising:
a first interchangeable head comprising:
a first fabrication module, wherein the first fabrication module comprises a dispensing syringe containing a dispensable circuit board material, wherein the dispensing syringe dispenses the dispensable circuit board material during fabrication of a printed circuit board; and
a first sheath for receiving and encasing the first fabrication module; and
a second interchangeable head comprising:
a second fabrication module, wherein the second fabrication module comprises a touch probe, and
a second sheath for receiving and encasing the second fabrication module, wherein the second sheath has the same structure as the first sheath;
a control system for alternatively controlling both the first and the second fabrication modules during fabrication of the printed circuit board, wherein the control system comprises:
a dispensing system for controlling the dispensing of the dispensable circuit board material during fabrication of the printed circuit board, wherein the dispensing system comprises:
a rotary gear, a motion conversion system coupled to the rotary gear, and a plunger for coupling to the motion conversion system via a piston, wherein the motion conversion system is configured to convert rotational motion of the rotary gear to linear motion to move the plunger to dispense the dispensable circuit board material during fabrication of the printed circuit board; and
a coupling mechanism for alternatively securely attaching and detaching both the first and the second interchangeable heads to a carriage mounted to the fabrication system.

2. The fabrication system of claim 1, wherein the first fabrication module is removable from the first sheath.

3. The fabrication system of claim 2, wherein the first fabrication module is lockable to the first sheath when encased in the first sheath.

4. The fabrication system of claim 1, wherein the dispensing syringe comprises a compartment for receiving the dispensing system.

5. The fabrication system of claim 1, wherein the first fabrication module is encased in the first sheath and affixed to the first sheath.

6. The fabrication system of claim 5, further comprising a third fabrication module comprising a drill head.

7. The fabrication system of claim 5, further comprising a fourth fabrication module comprising a pick and place device.

8. The fabrication system of claim 1, wherein the coupling mechanism is a magnetic coupling mechanism for securely attaching to a complementary magnetic coupling mechanism of the print head carriage.

9. The fabrication system of claim 8, wherein the magnetic coupling mechanism comprises at least one pair of arms extending from the first sheath, each arm comprising a magnet for securely attaching to a metal rod of the complementary magnetic coupling mechanism of the print head carriage.

10. A fabrication head assembly for a fabrication system, the fabrication head assembly comprising:
a carriage comprising:
a housing mountable to the fabrication system;
a first coupling mechanism; and
a first interchangeable head comprising:
a first fabrication module, wherein the first fabrication module comprises a dispensing syringe containing a dispensable circuit board material, wherein the dispensing syringe dispenses the dispensable circuit board material during fabrication of a printed circuit board;
a first sheath for receiving and encasing the first fabrication module; and
a second coupling mechanism for securely attaching and detaching the first interchangeable head to the first coupling mechanism of the carriage, and
a second interchangeable head comprising:
a second fabrication module, wherein the second fabrication module comprises a touch probe;
a second sheath for receiving and encasing the second fabrication module, wherein the second sheath has the same structure as the first sheath; and
a third coupling mechanism for securely attaching and detaching the second interchangeable head to the first coupling mechanism of the carriage;
a control system alternatively attached to both the first and second fabrication modules for alternatively controlling the fabrication module during fabrication of the printed circuit board, wherein the control system comprises:
a dispensing system for controlling the dispensing of the dispensable circuit board material during fabrication of the printed circuit board, wherein the dispensing system comprises:
a rotary gear, a motion conversion system coupled to the rotary gear, and a plunger for coupling to the motion conversion system via a piston, wherein the motion conversion system is configured to convert rotational motion of the rotary gear to linear motion to move the plunger to dispense the dispensable circuit board material during fabrication of the printed circuit board.

11. The fabrication head assembly of claim 10, wherein the first fabrication module is removable from the first sheath.

12. The fabrication head assembly of claim 11, wherein the first fabrication module is lockable to the first sheath when encased in the first sheath.

13. The fabrication head assembly of claim 10, wherein the dispensing syringe comprises a compartment for receiving the dispensing system.

14. The fabrication head assembly of claim 10, wherein the first fabrication module is encased in first the sheath and affixed to the first sheath.

15. The fabrication head assembly of claim 10, further comprising a third fabrication module comprising a drill head.

16. The fabrication head assembly of claim 15, further comprising a fourth fabrication module comprising a pick and place device.

* * * * *